(12) United States Patent
Chong (10) Patent No.: US 10,283,753 B2
(45) Date of Patent: May 7, 2019

(54) CELL AND ELECTROCHEMICAL DEVICE (71) Applicants: Dongguan Amperex Technology Limited, Dongguan (CN); Ningde Amperex Technology Limited, Ningde (CN)

(72) Inventor: Jin Chong, Chong (CN)

(73) Assignees: Dongguan Amperex Technology Limited, Dongguan (CN); Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 15/925,660

(22) Filed: Mar. 19, 2018

(65) Prior Publication Data
US 2018/0277821 A1 Sep. 27, 2018

Related U.S. Application Data (63) Continuation of application No. 14/928,875, filed on Oct. 30, 2015.

(30) Foreign Application Priority Data
Nov. 10, 2014 (CN) .......................... 2014 1 0627615

(51) Int. Cl.
*H01M 2/00* (2006.01)
*H01M 2/26* (2006.01)
(Continued)

(52) U.S. Cl.
CPC ............. *H01M 2/26* (2013.01); *H01M 2/345* (2013.01); *H01M 2/348* (2013.01); *H01M 4/70* (2013.01)

(58) Field of Classification Search
CPC ........ H01M 2/26; H01M 2/345; H01M 2/348; H01M 4/70
See application file for complete search history.

(56) References Cited

U.S. PATENT DOCUMENTS 8,334,071 B2 * 12/2012 Morishima ........... H01M 2/263
429/209
8,450,008 B2 5/2013 Kim et al.
(Continued)

FOREIGN PATENT DOCUMENTS

| CN | 102005596 A | 4/2011 |
| CN | 103560224 A | 2/2014 |
| CN | 203800133 U | 8/2014 |

*Primary Examiner* — Raymond Alejandro
(74) *Attorney, Agent, or Firm* — Knobbe Martens Olson and Bear, LLP (57) ABSTRACT

The present disclosure provides a cell and an electrochemical device. The cell comprises: a first electrode plate comprising a first current collector and a first active material layer, a second electrode plate comprising a second current collector and a second active material layer; a first electrode tab, a second electrode tab, a separator. The first current collector has a first surface uncoated region; the second current collector has a second surface uncoated region; the first electrode tab is provided on the first surface uncoated region, the second electrode tab is provided on the second surface uncoated region. The first electrode tab and/or the second electrode tab are enlarged in length and width. When the cell is subjected to a mechanical shock, the first electrode tab and the second electrode tab are deformed to puncture the separator therebetween, so the first current collector and the second current collector are electrically connected.

18 Claims, 6 Drawing Sheets

(51) Int. Cl.
*H01M 2/34* (2006.01)
*H01M 4/70* (2006.01)

(56) References Cited

U.S. PATENT DOCUMENTS

| | | | |
|---|---|---|---|
| 8,734,985 B2 * | 5/2014 | Kim | H01M 2/263 429/211 |
| 2012/0064385 A1 * | 3/2012 | Park | H01M 2/0212 429/139 |
| 2012/0189899 A1 * | 7/2012 | Kanda | H01M 2/266 429/153 |
| 2013/0045405 A1 * | 2/2013 | Ahn | H01M 10/0468 429/94 |

* cited by examiner

CELL AND ELECTROCHEMICAL DEVICE

CROSS-REFERENCE TO RELATED APPLICATIONS

The present application is a continuation of U.S. patent application Ser. No. 14/928875, filed Oct. 30, 2015, which claims priority to Chinese Pat. Appl. No. 201410627615.7, filed on Nov. 10, 2014. All of the above Applications are incorporated by reference herein and made a part of this specification. Any and all applications for which foreign or domestic priority claim is identified in the Application Data Sheet as filed with the present application are hereby incorporated.

TECHNICAL FIELD OF THE PRESENT DISCLOSURE

The present disclosure relates to a field of energy storage devices, and particularly relates to a cell and an electrochemical device.

BACKGROUND OF THE PRESENT DISCLOSURE

With the rapid development of transportation, communication and information industry and increasingly serious energy crisis, and with birth and development of electric vehicles and various portable devices, it is urgent to require an alternative energy with high performance. Because a secondary lithium battery has the advantages, such as high energy density, high cycle performance and low self-discharge rate and the like, it becomes an ideal choice for the alternative energy as a chemical power source. At present, it has been widely used in notebook computers, smart phones, electric tools and other consumer electronics, and has made considerable development and progress in fields of electric vehicles, energy storage batteries and the like in recent years, The application field of the lithium-ion battery continues to expand rapidly, while the safety performance is always a key issue to be concerned and resolved in the lithium-ion battery industry, and becomes an important factor in determining the development prospects of lithium-ion battery. Causes of safety accidents of the lithium-ion battery include a battery internal short circuit and an external abuse. The factors associated with abuse mainly include external environment overheating, external short circuit, overcharge/overdischarge, and nailing, crushing, impact and other mechanical shocks. In accordance with the level of risk, the safety accidents caused by the above potential safety hazards can be divided into battery swelling, breakage of packaging, smoking, firing, and explosion caused by thermal runaway.

Eliminating the potential safety hazards and reducing the level of risk are effective ways to improve the safety performance of the lithium-ion battery. And, increasing lengths of a part of an aluminum foil current collector not provided with a positive active material layer and a part of a copper foil current collector not provided with a negative active material layer of a wound-type cell at an ending part is one technique widely used currently. Although the redundant part of the aluminum foil current collector not provided with the positive active material layer and the redundant part of the copper foil current collector not provided with the negative active material layer of the wound-type cell at the ending part can surround the cell, internal short circuits can be effectively converted to external short circuits in the cases of nailing, crushing, impact, so as to avoid thermal runaway occurring inside the lithium-ion battery caused by too large current, and in turn to reduce serious accidents such as burning and explosions. But at present the biggest obstacle in such a technology is at the expense of a volumetric specific energy of the battery as a precondition.

SUMMARY OF THE PRESENT DISCLOSURE

In view of the problem existing in the background, an object of the present disclosure is to provide a cell and an electrochemical device, which improve the safety performance of the cell.

In order to achieve the above object, in a first aspect, the present disclosure provides a cell, which comprises: a first electrode plate comprising a first current collector and a first active material layer which is selectively provided on a surface of the first current collector and contains a first active material; a second electrode plate opposite to the first electrode plate in electric polarity, comprising a second current collector and a second active material layer which is selectively provided on a surface of the second current collector and contains a second active material; a first electrode tab provided and electrically connected to the first current collector of the first electrode plate; a second electrode tab provided and electrically connected to the second current collector of the second electrode plate; and a separator provided between the first electrode plate and the second electrode plate. The surface of the first current collector has a part which is not provided with the first active material layer thereon and this part is defined as a first surface uncoated region; the surface of the second current collector has a part which is not provided with the second active material layer thereon and this part is defined as a second surface uncoated region; the first electrode tab is provided on the first surface uncoated region and the second electrode tab is provided on the second surface uncoated region. The first electrode tab extends toward two opposite transverse edges of the first surface uncoated region along a width direction and one side edge positioned outside in the width direction is close to one corresponding transverse edge of the first surface uncoated region, and the first electrode tab extends toward two opposite longitudinal edges of the first surface uncoated region along a length direction and two outer side edges in the length direction are close to the two longitudinal edges of the first surface uncoated region, respectively; and/or the second electrode tab extends toward two opposite transverse edges of the second surface uncoated region along the width direction and one side edge positioned outside in the width direction is close to one corresponding transverse edge of the second surface uncoated region, and the second electrode tab extends toward two opposite longitudinal edges of the second surface uncoated region along the length direction and two outer side edges in the length direction are close to the two longitudinal edges of the second surface uncoated region, respectively. The first electrode tab and the second electrode tab are spaced apart from each other in the width direction, and the separator is presented between the first electrode tab and the second electrode tab. When the cell is subjected to a mechanical shock, the first electrode tab and the second electrode tab are deformed to puncture the separator between the first electrode tab and the second electrode tab such that the first current collector and the second current collector are electrically connected.

In order to achieve the above object, in a second aspect, the present disclosure provides an electrochemical device, which comprises the cell according to the first aspect of the present disclosure.

The present disclosure has the following beneficial effects:

In the present disclosure, the first electrode tab extends toward two opposite transverse edges of the first surface uncoated region along the width direction and one side edge positioned outside in the width direction is close to one corresponding transverse edge of the first surface uncoated region, and the first electrode tab extends toward two opposite longitudinal edges of the first surface uncoated region along the length direction and two outer side edges in the length direction are close to the two longitudinal edges of the first surface uncoated region, respectively; and/or the second electrode tab extends toward two opposite transverse edges of the second surface uncoated region along the width direction and one side edge positioned outside in the width direction is close to one corresponding transverse edge of the second surface uncoated region, and the second electrode tab extends toward two opposite longitudinal edges of the second surface uncoated region along the length direction and two outer side edges in the length direction are close to the two longitudinal edges of the second surface uncoated region, respectively. Therefore, compared with the cell in the prior art, the first electrode tab and/or the second electrode tab of the cell of the present disclosure are/is enlarged in length and width, when the cell is subjected to a mechanical shock (for example, nailing, crushing, impact and the like), the first electrode tab and/or the second electrode tab which are/is enlarged in length and width are deformed to puncture the separator between the first electrode tab and the second electrode tab such that the first current collector and the second current collector are electrically connected, so that an internal short circuit which occurs inside the cell is converted to an external short circuit, an uncontrollable thermal runaway caused by the internal short circuit inside the cell is converted to a temperate controllable external short circuit, thereby reducing the occurrence risk of bad accidents such as burning and explosions, and greatly improving the safety performance of the cell.

Reference numerals of the embodiments are represented as follows:

1 first electrode plate
11 first current collector
  S11 surface
  B11 first surface uncoated region
  TE11 transverse edge
  LE11 longitudinal edge
12 first active material layer
2 second electrode plate
21 second current collector
  S21 surface
  B21 second surface uncoated region
  TE21 transverse edge
  LE21 longitudinal edge
22 second active material layer
3 first electrode tab
31 side edge
32 outer side edge
4 second electrode tab
41 side edge
42 outer side edge
5 separator
W width direction
L length direction
T thickness direction
P1 first protruding portion
P2 second protruding portion
R1 first recessing portion
R2 second recessing portion

DETAILED DESCRIPTION

Hereinafter a cell and electrochemical device according to the present disclosure will be described in detail in combination with the Figures.

Firstly a cell according to a first aspect of the present disclosure will be described.

Referring to FIGS. 3-15, a cell according to a first aspect of the present disclosure comprises: a first electrode plate 1 comprising a first current collector 11 and a first active material layer 12 which is selectively provided on a surface S11 of the first current collector 11 and contains a first active material; a second electrode plate 2 opposite to the first electrode plate 1 in electric polarity, comprising a second current collector 21 and a second active material layer 22 which is selectively provided on a surface S21 of the second current collector 21 and contains a second active material; a first electrode tab 3 provided and electrically connected to the first current collector 11 of the first electrode plate 1; a second electrode tab 4 provided and electrically connected to the second current collector 21 of the second electrode plate 2; and a separator 5 provided between the first electrode plate 1 and the second electrode plate 2. The surface S11 of the first current collector 11 has a part which is not provided with the first active material layer 12 thereon and this part is defined as a first surface uncoated region B11; the surface S21 of the second current collector 21 has a part which is not provided with the second active material layer 22 thereon and this part is defined as a second surface uncoated region B21; the first electrode tab 3 is provided on the first surface uncoated region B11 and the second electrode tab 4 is provided on the second surface uncoated region B21; the first electrode tab 3 extends toward two opposite transverse edges TE11 of the first surface uncoated region B11 along a width direction W and one side edge 31 positioned outside in the width direction W is close to one corresponding transverse edge TE11 of the first surface uncoated region B11, and the first electrode tab 3 extends toward two opposite longitudinal edges LE11 of the first surface uncoated region B11 along a length direction L and two outer side edges 32 in the length direction L are close to the two longitudinal edges LE11 of the first surface uncoated region B11, respectively; and/or the second electrode tab 4 extends toward two opposite transverse edges TE21 of the second surface uncoated region B21 along the width direction W and one side edge 41 positioned outside in the width direction W is close to one corresponding transverse edge TE21 of the second surface uncoated region B21, and the second electrode tab 4 extends toward two opposite longitudinal edges LE21 of the second surface uncoated region B21 along the length direction L and two outer side edges 42 in the length direction L are close to the two longitudinal edges LE21 of the second surface uncoated region B21, respectively; the first electrode tab 3 and the second electrode tab 4 are spaced apart from each other in the width direction W, and the separator 5 is presented between the first electrode tab 3 and the second electrode tab 4. When the cell is subjected to a mechanical shock, the first electrode tab 3 and the second electrode tab 4 are deformed to puncture the separator 5 between the first electrode tab 3 and the second electrode tab 4 such that the first current collector 11 and the second current collector 21 are electrically connected. Here, it should be noted that, the use of a term of "and/or" represents a mutual relationship between that the first electrode tab 3 is provided on the first surface uncoated region B11 (that is the first current collector 11) and that the second electrode tab 4 is provided on the second surface uncoated region B21 (that is the second current collector 21). Specifically, because the first electrode tab 3 and the first current collector 11 can be integrally formed or separately formed and the second electrode tab 4 and the second current collector 21 can be integrally formed or separately formed, when the first electrode tab 3 and the first current collector 11 are integrally formed, the second electrode tab 4 and the second current collector 21 must be separately formed; when the second electrode tab 4 and the second current collector 21 are integrally formed, the first electrode tab 3 and the first current collector 11 must be separately formed; when the first electrode tab 3 and the first current collector 11 are separately formed, the second electrode tab 4 and the second current collector 21 may be separately formed. However, that the first electrode tab 3 and the first current collector 11 are integrally formed and that the second electrode tab 4 and the second current collector 21 are integrally formed can not exist at the same time.

Here, it should be noted that, that the first active material layer 12 is selectively provided on the surface S11 of the first current collector 11 refers to that one surface S11 of the first current collector 11 is entirely provided with the first active material layer 12, or one surface S11 of the first current collector 11 is partly provided with the first active material layer 12. Similarly, that the second active material layer 22 is selectively provided on the surface S21 of the second current collector 21 refers to that one surface S21 of the second current collector 21 is entirely provided with the second active material layer 22 or one surface S21 of the second current collector 21 is partly provided with the second active material layer 22. Of course, as long as the surface S11 of the first current collector 11 has a part which is not provided with the first active material layer 12 thereon and the surface S21 of the second current collector 21 has a part which is not provided with the second active material layer 22 thereon and these two parts are adjacent and opposite.

Here, it should be noted that, that the first current collector 11 and the second current collector 21 are electrically connected may be that the first surface uncoated region B11 of the first current collector 11 on which the first electrode tab 3 is provided is in direct contact with the second surface uncoated region B21 of the second current collector 21 on which the second electrode tab 4 is provided, may also be that the first electrode tab 3 is in direct contact with the second surface uncoated region B21 of the second current collector 21 on which the second electrode tab 4 is provided, may also be that the first surface uncoated region B11 of the first current collector 11 on which the first electrode tab 3 is provided is in direct contact with the second electrode tab 4, may also be that the first electrode tab 3 is in contact with the second electrode tab 4.

Figure 1:
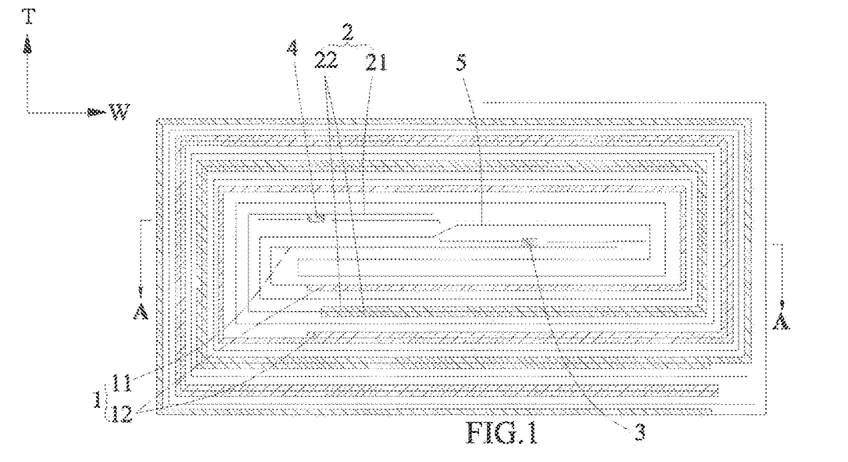
FIG. 1 is a plan view of a cell in the prior art.
Figure 2:
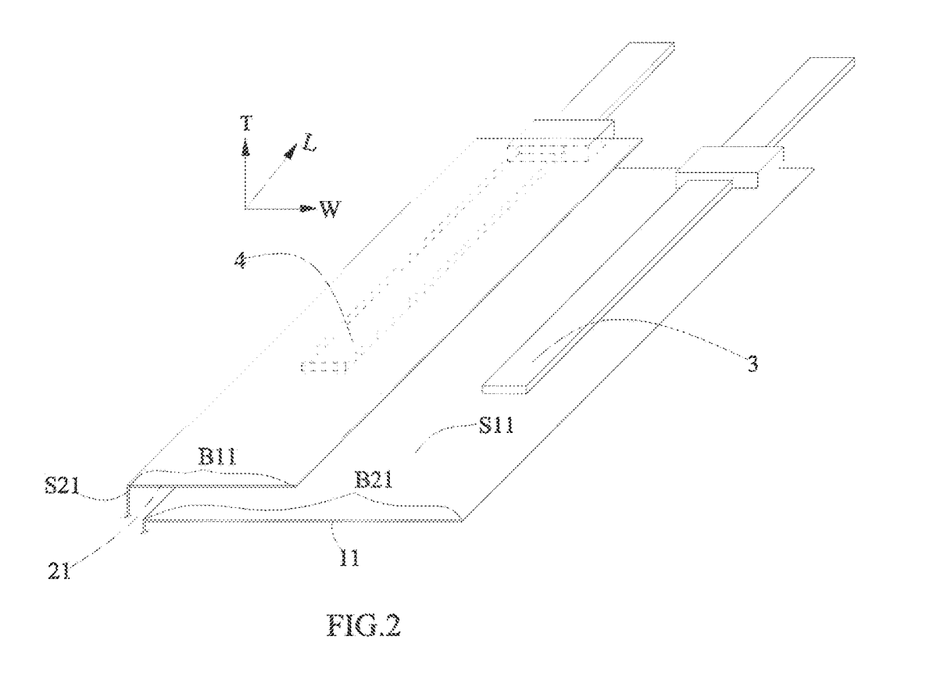
FIG. 2 is a partial perspective view taken along a line A-A of FIG. 1, for the sake of clarity, a part of a profile of a second electrode tab is shown by a dotted line in a simplified manner.
Figure 3:
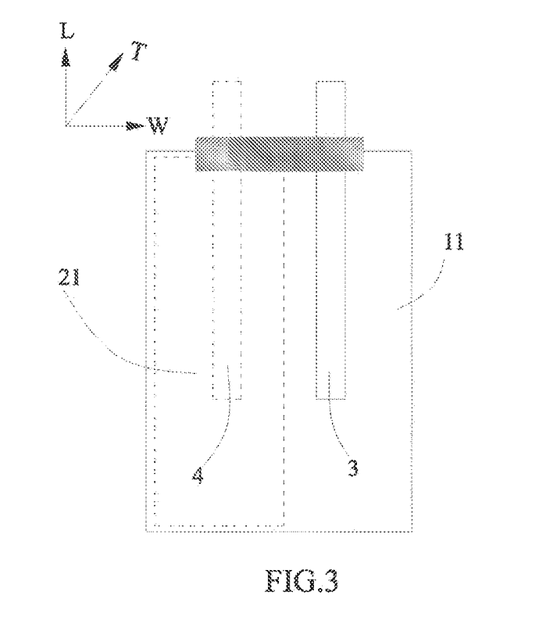
FIG. 3 is a simplified top view along FIG. 2, for the sake of clarity, the profile of the second electrode plate is shown by a dotted line in a simplified manner.

Compared with the cell in the prior art (referring to FIGS. 1-3), the first electrode tab 3 and the second electrode tab 4 of the cell of the present disclosure (referring to FIGS. 4-17) are enlarged in length and width, when the cell is subjected to a mechanical shock (for example, nailing, crushing, impact and the like), the first electrode tab 3 and the second electrode tab 4 which are enlarged in length and width are deformed to puncture the separator 5 between the first electrode tab 3 and the second electrode tab 4 such that the first current collector 11 and the second current collector 21 are electrically connected, so that an internal short circuit which occurs inside the cell is converted to an external short circuit, an uncontrollable thermal runaway caused by the internal short circuit inside the cell is converted to a temperate controllable external short circuit, thereby reducing the occurrence risk of bad accidents such as burning and explosions, and greatly improving the safety performance of the cell.

In an embodiment of the cell according to the first aspect of the present disclosure, the first electrode plate 1 may be a positive electrode plate or a negative electrode plate, the first current collector 11 of the first electrode plate 1 is correspondingly a positive current collector or a negative current collector, the first electrode tab 3 is correspondingly a positive electrode tab or a negative electrode tab; the second electrode plate 2 is correspondingly a negative electrode plate or a positive electrode plate, the second current collector 21 of the second electrode plate 2 is correspondingly a negative current collector or a positive current collector, the second electrode tab 4 is correspondingly a negative electrode tab or a positive electrode tab.

In an embodiment of the cell according to the first aspect of the present disclosure, the negative current collector may be a copper foil, the negative electrode tab may be a nickel sheet.

In an embodiment of the cell according to the first aspect of the present disclosure, the positive current collector may be an aluminum foil, the positive electrode tab may be an aluminium sheet.

Figure 4:
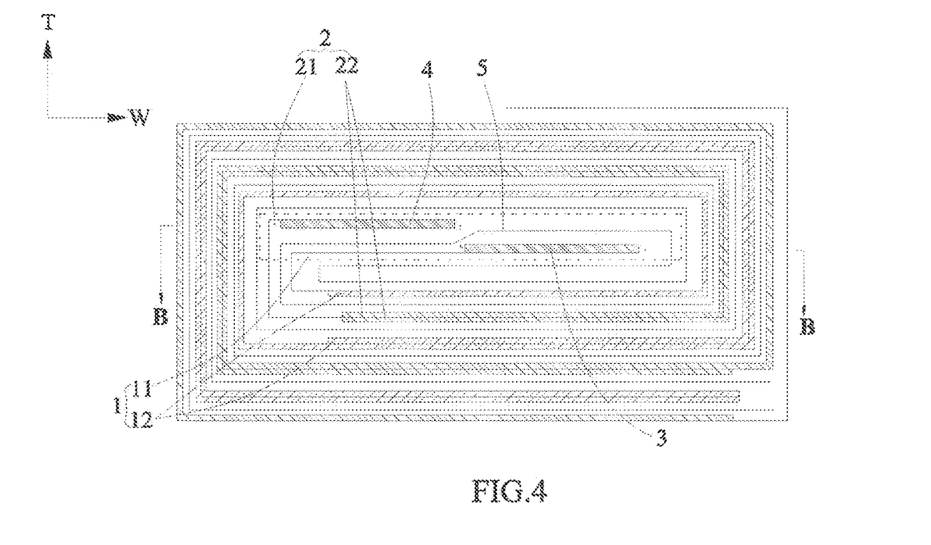
FIG. 4 is a plan view of the cell according to the present disclosure.
Figure 5:
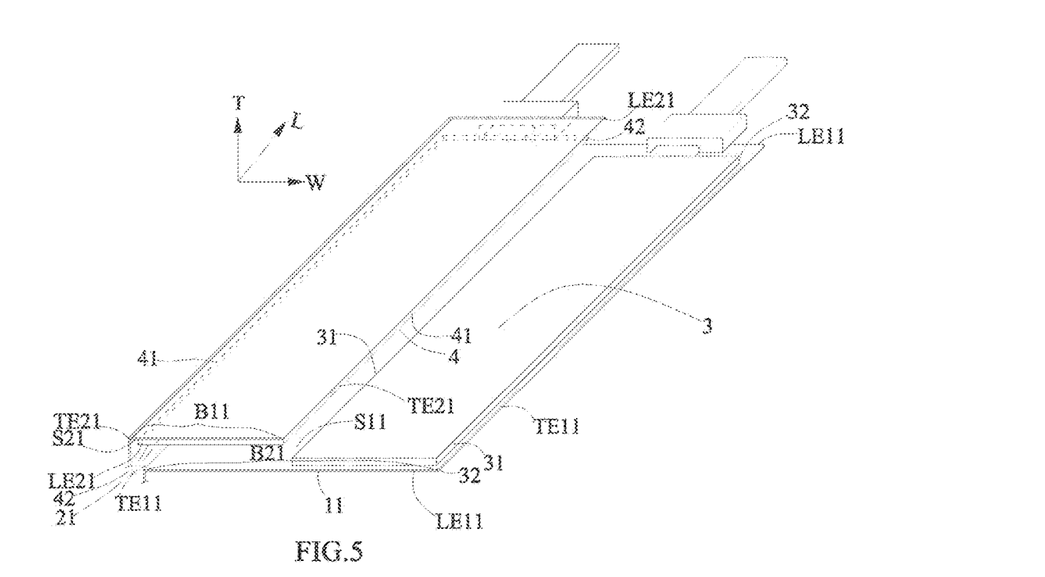
FIG. 5 is a partial perspective view taken along a line B-B of FIG. 4, for the sake of clarity, a part of the profile of the second electrode tab is shown by a dotted line in a simplified manner.
Figure 6:
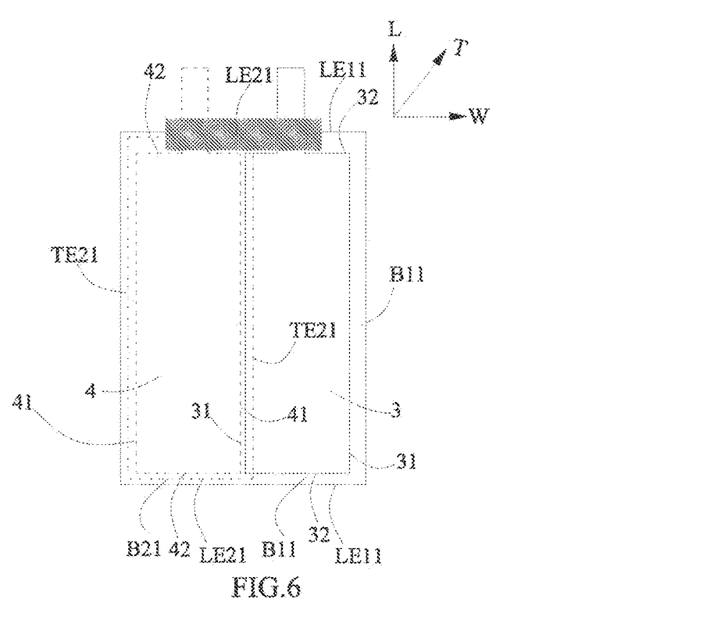
FIG. 6 is a simplified top view along FIG. 5, for the sake of clarity, the profile of the second electrode plate is shown by a dotted line in a simplified manner.
Figure 7:
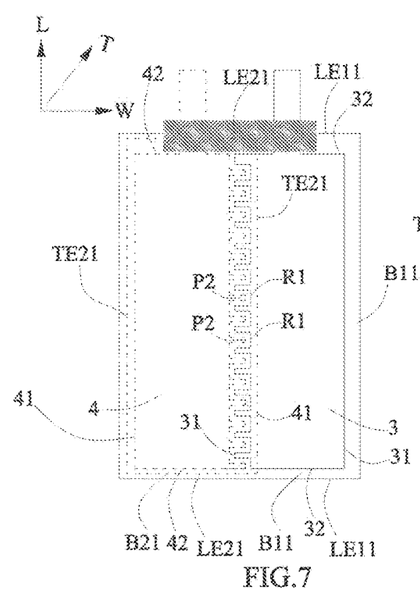
FIG. 7 is a view of an alternative embodiment similar to FIG. 6.

In an embodiment of the cell according to the first aspect of the present disclosure, referring to FIG. 4, the cell is a wound-type cell, the first surface uncoated region B11 of the first current collector 11 on which the first electrode tab 3 is provided and the second surface uncoated region B21 of the second current collector 21 on which the second electrode tab 4 is provided are positioned at a winding-started part of the wound-type cell (referring to FIG. 4 and FIG. 5), a winding-ended part (not shown), and parts other than the winding-started part and the winding-ended part (not shown). Although the figures only illustrate the situations that the first surface uncoated region B11 of the first current collector 11 on which the first electrode tab 3 is provided and the second surface uncoated region B21 of the second current collector 21 on which the second electrode tab 4 is provided are positioned at the winding-started part of the wound-type cell, but the present disclosure is not limited to that, positions of the first surface uncoated region B11 of the first current collector 11 on which the first electrode tab 3 is provided and the second surface uncoated region B21 of the second current collector 21 on which the second electrode tab 4 is provided can be determined according to a practical situation. In an embodiment, referring to FIG. 4 and FIG. 5, at the winding-started part, two surfaces of the first current collector 11 at a position where the first electrode tab 3 is provided are not provided with the first active material layer 12 (that is the two surfaces both have the first surface uncoated regions B11), two surfaces of the second current collector 21 at a position where the second electrode tab 4 is provided are not provided with the second active material layer 22 (that is the two surfaces both have the second surface uncoated regions B21), but the present disclosure is not limited to that. One surface of the first current collector 11 at a position where the first electrode tab 3 is provided can not be provided with the first active material layer 12 either, one surface of the second current collector 21 at a position where the second electrode tab 4 is provided can not be provided with the second active material layer 22 either, as long as the surface S11 of the first current collector 11 has a part which is not provided with the first active material layer 12 thereon and the surface S21 of the second current collector 21 has a part which is not provided with the second active material layer 22 thereon, and these two parts are adjacent and opposite.

In an embodiment of the cell according to the first aspect of the present disclosure, the cell is a laminated-type cell (not shown), two surfaces of the first current collector 11 at a position where the first electrode tab 3 is provided are not provided with the first active material layer 12, two surfaces of the second current collector 21 at a position where the second electrode tab 4 is provided are not provided with the second active material layer 22.

In an embodiment of the cell according to the first aspect of the present disclosure, the cell is a wound and laminated-type cell (not shown), when started with winding, the first surface uncoated region B11 of the first current collector 11 on which the first electrode tab 3 is provided and the second surface uncoated region B21 of the second current collector 21 on which the second electrode tab 4 is provided are positioned at the winding-started part, and two surfaces of the first current collector 11 at a position where the first electrode tab 3 is provided are not provided with the first active material layer 12, two surfaces of the second current collector 21 at a position where the second electrode tab 4 is provided are not provided with the second active material layer 22.

In an embodiment of the cell according to the first aspect of the present disclosure, the cell is a wound and laminated-type cell, when started with laminating, the first surface uncoated region B11 of the first current collector 11 on which the first electrode tab 3 is provided and the second surface uncoated region B21 of the second current collector 21 on which the second electrode tab 4 is provided are positioned at the winding-ended part, and two surfaces of the first current collector 11 at a position where the first electrode tab 3 is provided are not provided with the first active material layer 12, two surfaces of the second current collector 21 at a position where the second electrode tab 4 is provided are not provided with the second active material layer 22.

In an embodiment of the cell according to the first aspect of the present disclosure, the first electrode tab 3 may be welded to the first current collector 11 of the first electrode plate 1 or may be formed by cutting the first current collector 11 of the first electrode plate 1; and/or the second electrode tab 4 may be welded to the second current collector 21 of the second electrode plate 2 or may be formed by cutting the second current collector 21 of the second electrode plate 2. However, it should be noted that, the first electrode tab 3 and the second electrode tab 4 can not be formed by cutting at the same time. In other words, when the first electrode tab 3 is formed by cutting, the second electrode tab 4 is formed by welding; when the second electrode tab 4 is formed by cutting, the first electrode tab 3 is formed by welding. But both the first electrode tab 3 and the second electrode tab 4 can be formed by welding.

In an embodiment of the cell according to the first aspect of the present disclosure, the first electrode tab 3 and the second electrode tab 4 each have a thickness of TT, and 5 µm≤TT≤100 µm; the first electrode tab 3 and the second electrode tab 4 each have a length of LT, and 10 mm≤LT≤500 mm; the first electrode tab 3 and the second electrode tab 4 each have a width of WT, and 2 mm≤WT≤250 mm.

In an embodiment of the cell according to the first aspect of the present disclosure, a minimum distance between the one side edge 31 of the first electrode tab 3 positioned outside in the width direction W and the one corresponding transverse edge TE11 of the first surface uncoated region B11 is 3 mm.

In an embodiment of the cell according to the first aspect of the present disclosure, a minimum distance between the each outer side edge 32 of the first electrode tab 3 in the length direction L and the one corresponding longitudinal edge LE11 of the first surface uncoated region B11 is 3 mm.

In an embodiment of the cell according to the first aspect of the present disclosure, a minimum distance between the one side edge 41 of the second electrode tab 4 positioned outside in the width direction W and the one corresponding transverse edge TE21 of the second surface uncoated region B21 is 3 mm.

In an embodiment of the cell according to the first aspect of the present disclosure, a minimum distance between the each outer side edge 42 of the second electrode tab 4 in the length direction L and the one corresponding longitudinal edge LE21 of the second surface uncoated region B21 is 3 mm.

In an embodiment of the cell according to the first aspect of the present disclosure, a distance between the one side edge 31 of the first electrode tab 3 positioned inside in the width direction W and the one side edge 41 of the second electrode tab 4 positioned inside in the width direction W is 1 mm~5 mm in the width direction W.

Figure 8:
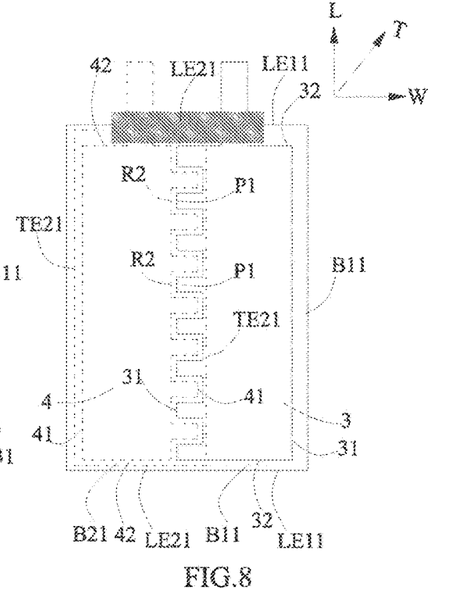
FIG. 8 is a view of an alternative embodiment similar to FIG. 7.

In an embodiment of the cell according to the first aspect of the present disclosure, referring to FIG. 8, the one side edge 31 of the first electrode tab 3 positioned inside in the width direction W and the one side edge 41 of the second electrode tab 4 positioned inside in the width direction W are respectively provided with a plurality of first protruding portions P1 and a plurality of second recessing portions R2 which form a jagged shape and are matched in form of concave-convex.

In an embodiment of the cell according to the first aspect of the present disclosure, referring to FIG. 7 and FIGS. 11-17, the one side edge 31 of the first electrode tab 3 positioned inside in the width direction W and the one side edge 41 of the second electrode tab 4 positioned inside in the width direction W are respectively provided with a plurality of first recessing portions R1 and a plurality of second protruding portions P2 which form a jagged shape and are matched in form of concave-convex.

Figure 9:
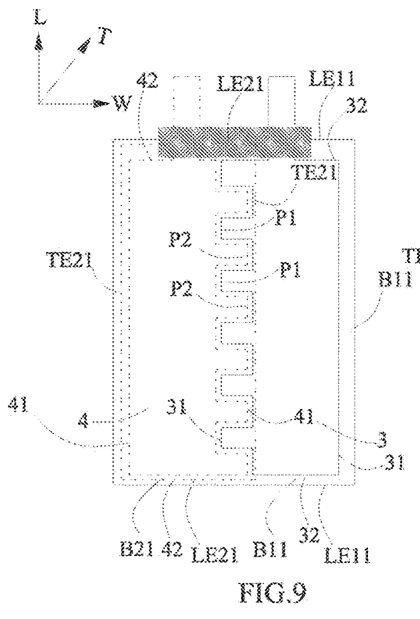
FIG. 9 is a view of an alternative embodiment similar to FIG. 8.

In an embodiment of the cell according to the first aspect of the present disclosure, referring to FIG. 9, the one side edge 31 of the first electrode tab 3 positioned inside in the width direction W and the one side edge 41 of the second electrode tab 4 positioned inside in the width direction W are respectively provided with a plurality of first protruding portions P1 and a plurality of second protruding portions P2 which form a jagged shape and are matched in clearance fit.

Figure 10:
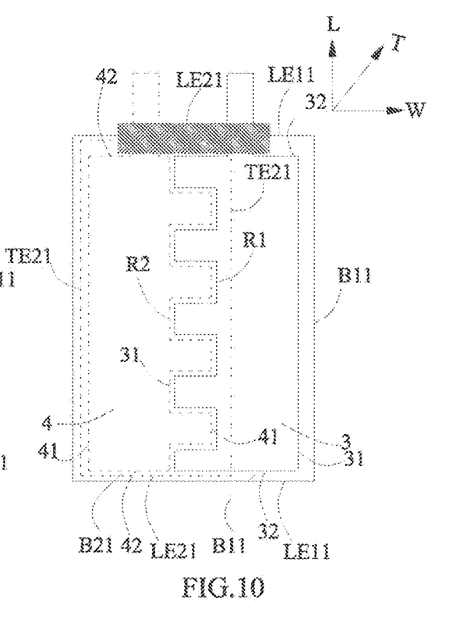
FIG. 10 is a view of an alternative embodiment similar to FIG. 9.
Figure 11:
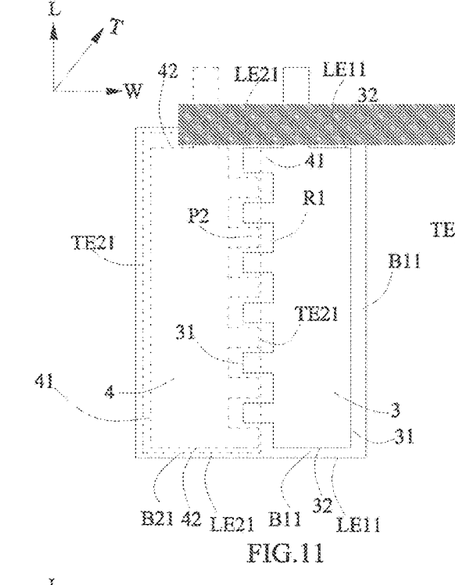
FIG. 11 is a view of an alternative embodiment similar to FIG. 10.
Figure 12:
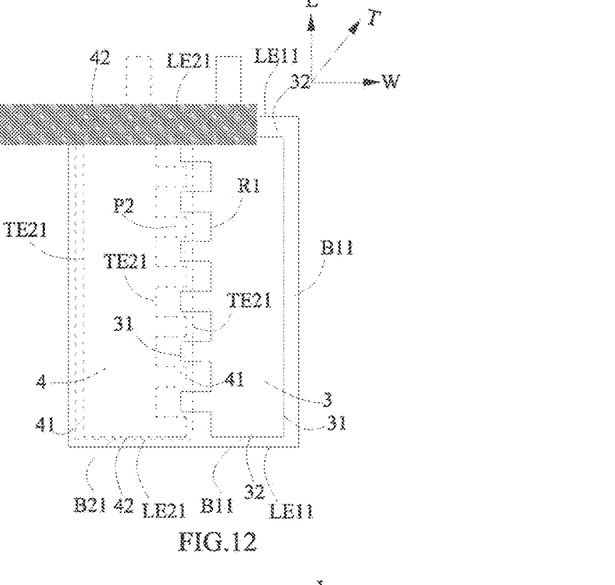
FIG. 12 is a view of an alternative embodiment similar to FIG. 11.

In an embodiment of the cell according to the first aspect of the present disclosure, referring to FIG. 10, the one side edge 31 of the first electrode tab 3 positioned inside in the width direction W and the one side edge 41 of the second electrode tab 4 positioned inside in the width direction W are respectively provided with a plurality of first recessing portions R1 and a plurality of second recessing portions R2 which form a jagged shape and are matched in clearance fit.

In an embodiment of the cell according to the first aspect of the present disclosure, the first electrode tab 3 and the first protruding portion P1 or the first recessing portion R1 provided on the first electrode tab 3 are integrally formed; the second electrode tab 4 and the second protruding portion P2 or the second recessing portion R2 provided on the second electrode tab 4 are integrally formed.

Figure 13:
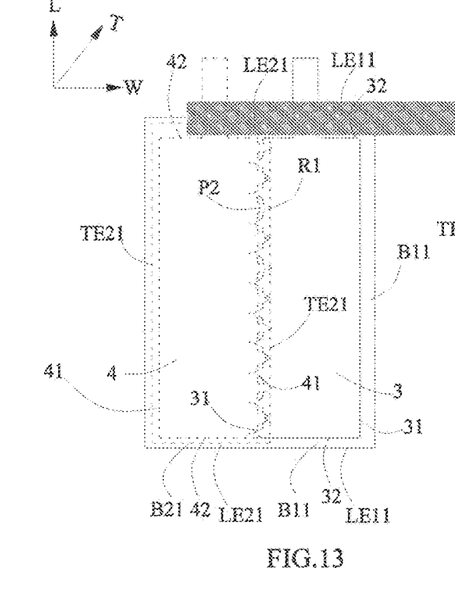
FIG. 13 is a view of an alternative embodiment similar to FIG. 12.
Figure 14:
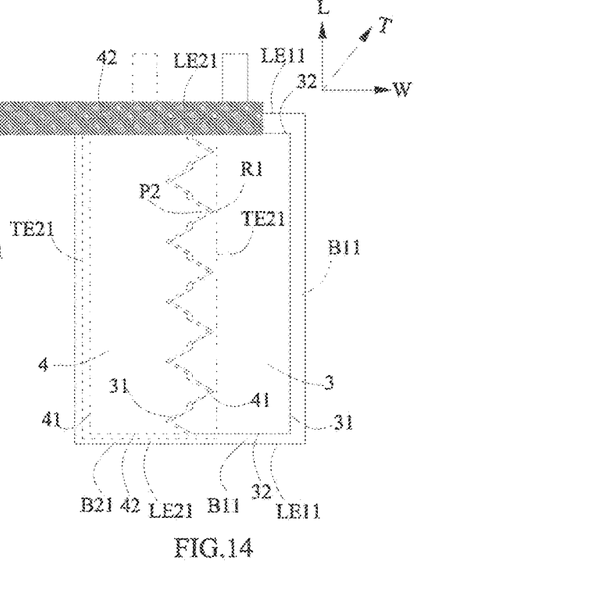
FIG. 14 is a view of an alternative embodiment similar to FIG. 13.
Figure 15:
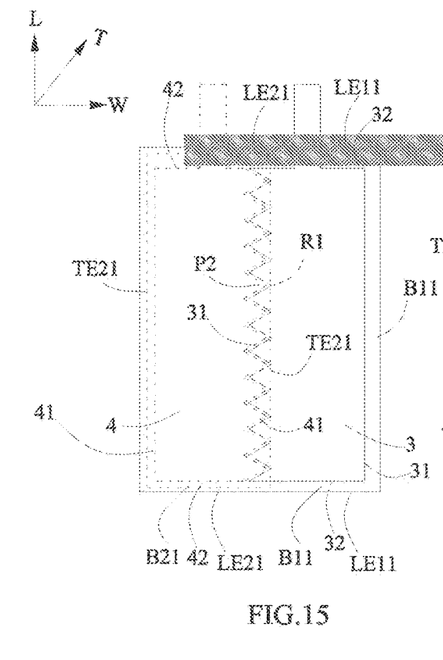
FIG. 15 is a view of an alternative embodiment similar to FIG. 14.
Figure 16:
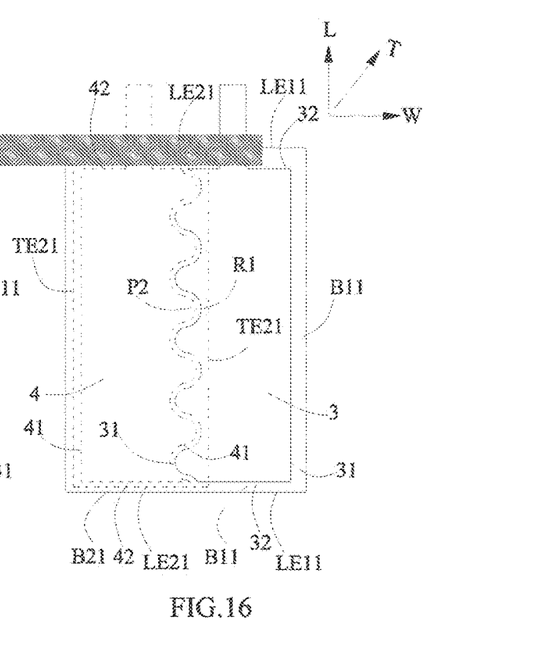
FIG. 16 is a view of an alternative embodiment similar to FIG. 15.
Figure 17:
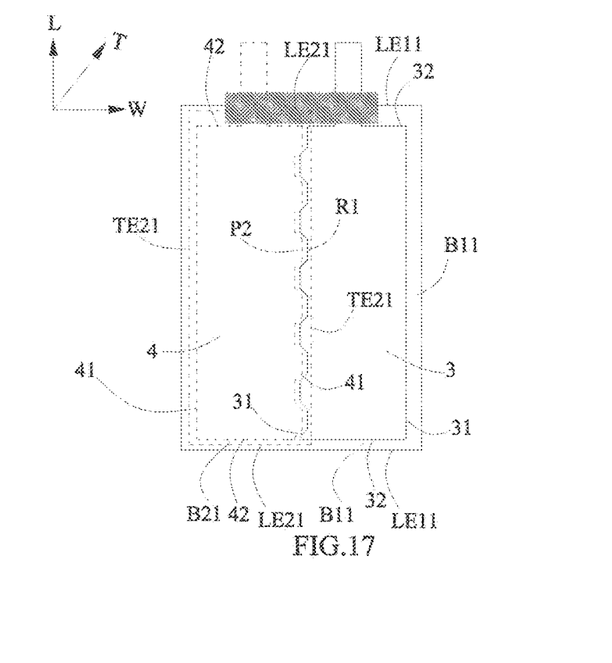
FIG. 17 is a view of an alternative embodiment similar to FIG. 16.

In an embodiment of the cell according to the first aspect of the present disclosure, a shape of the first protruding portion P1, a shape of the first recessing portion R1, a shape of the second protruding portion P2, a shape of the second recessing portion R2 each are one of a rectangle (referring to FIGS. 7-10), a square (referring to FIG. 11 and FIG. 12), a triangle (referring to FIG. 15), a semicircle (referring to FIG. 16), a trapezoid (referring to FIG. 17), a polygon with more than four sides (referring to FIG. 13 and FIG. 14, which is a pyramid shape with a base). Shapes of the first protruding portion P1, the first recessing portion R1, the second protruding portion P2, the second recessing portion R2 are not limited to the examples shown in the figures, changes can be made according to the spirit and gist of the present disclosure.

In an embodiment of the cell according to the first aspect of the present disclosure, at least one of the one side edge 31 of the first electrode tab 3 positioned inside in the width direction W and the one side edge 41 of the second electrode tab 4 positioned inside in the width direction W is flat. In an embodiment, referring to FIG. 5 and FIG. 6, one side edge 31 of the first electrode tab 3 positioned inside in the width direction and one side edge 41 of the second electrode tab 4 positioned inside in the width direction W are both flat.

Next, an electrochemical device according to a second aspect of the present disclosure will be described.

The electrochemical device according to the second aspect of the present disclosure comprises the cell according to the first aspect of the present disclosure.

In an embodiment of the electrochemical device according to the second aspect of the present disclosure, the electrochemical device may be a battery or a capacitor.

What is claimed is:

1. A cell, comprising:
a first electrode plate (1) comprising a first current collector (11) and a first active material layer (12) which is selectively provided on a surface (S11) of the first current collector (11) and contains a first active material;
a second electrode plate (2) opposite to the first electrode plate (1) in electric polarity, comprising a second current collector (21) and a second active material layer (22) which is selectively provided on a surface (S21) of the second current collector (21) and contains a second active material;
a first electrode tab (3) provided and electrically connected to the first current collector (11) of the first electrode plate (1);
a second electrode tab (4) provided and electrically connected to the second current collector (21) of the second electrode plate (2); and
a separator (5) provided between the first electrode plate) and the second electrode plate (2);
the surface (S11) of the first current collector (11) having a part which is not provided with the first active material layer (12) thereon and this part being defined as a first surface uncoated region (B11);
the surface (S21) of the second current collector (21) having a part which is not provided with the second active material layer (22) thereon and this part being defined as a second surface uncoated region (B21);
the first electrode tab (3) being provided on the first surface uncoated region (B11) and the second electrode tab (4) being provided on the second surface uncoated region (B21);
the first electrode tab (3) extending toward two opposite transverse edges (TE11) of the first surface uncoated region (B11) along a width direction (W) and one side edge (31) positioned outside in the width direction (W) being close to one corresponding transverse edge (TE11) of the first surface uncoated region (B11), and the first electrode tab (3) extending toward two opposite longitudinal edges (LE11) of the first surface uncoated region (B11) along a length direction (L) and two outer side edges (32) in the length direction (L) being close to the two longitudinal edges (LE11) of the first surface uncoated region (B11), respectively; and/or the second electrode tab (4) extending toward two opposite transverse edges (TE21) of the second surface uncoated region (B21) along the width direction (W) and one side edge (41) positioned outside in the width direction (W) being close to one corresponding transverse edge (TE21) of the second surface uncoated region (B21), and the second electrode tab (4) extending toward two opposite longitudinal edges (LE21) of the second surface uncoated region (B21) along the length direction (L) and two outer side edges (42) in the length direction (L) being close to the two longitudinal edges (LE21) of the second surface uncoated region (B21), respectively;

the first electrode tab (3) and the second electrode tab (4) being spaced apart from each other in the width direction (W), and the separator (5) being presented between the first electrode tab (3) and the second electrode tab (4);

when the cell is subjected to a mechanical shock, the first electrode tab (3) and the second electrode tab (4) being deformed to puncture the separator (5) between the first electrode tab (3) and the second electrode tab (4) such that the first current collector (11) and the second current collector (21) being electrically connected.

2. The cell according to claim 1, wherein
the first electrode tab (3) is welded to the first current collector (11) of the first electrode plate (1) or is formed by cutting the first current collector (11) of the first electrode plate (1); and/or
the second electrode tab (4) is welded to the second current collector (21) of the second electrode plate (2) or is formed by cutting the second current collector (21) of the second electrode plate (2).

3. The cell according to claim 1, wherein
the first electrode tab (3) and the second electrode tab (4) each have a thickness of TT, and 5 µm≤TT≤100 µm;
the first electrode tab (3) and the second electrode tab (4) each have a length of LT, and 10 mm≤LT≤500 mm;
the first electrode tab (3) and the second electrode tab (4) each have a width of WT, and 2 mm≤WT≤250 mm.

4. The cell according to claim 1, wherein
a minimum distance between the one side edge (31) of the first electrode tab (3) positioned outside in the width direction (W) and the one corresponding transverse edge (TE11) of the first surface uncoated region (B11) is 3 mm;
a minimum distance between the each outer side edge (32) of the first electrode tab (3) in the length direction (L) and the one corresponding longitudinal edge (LE11) of the first surface uncoated region (B11) is 3 mm;
a minimum distance between the one side edge (41) of the second electrode tab (4) positioned outside in the width direction (W) and the one corresponding transverse edge (TE21) of the second surface uncoated region (B21) is 3 mm;
a minimum distance between the each outer side edge (42) of the second electrode tab (4) in the length direction (L) and the one corresponding longitudinal edge (LE21) of the second surface uncoated region (B21) is 3 mm.

5. The cell according to claim 1, wherein a distance between the one side edge (31) of the first electrode tab (3) positioned inside in the width direction (W) and the one side edge (41) of the second electrode tab (4) positioned inside in the width direction (W) is 1 mm~5 mm in the width direction (W).

6. The cell according to claim 1, wherein
the one side edge (31) of the first electrode tab (3) positioned inside in the width direction (W) and the one side edge (41) of the second electrode tab (4) positioned inside in the width direction (W) are respectively provided with a plurality of first protruding portions (P1) and a plurality of second recessing portions (R2) which farm a jagged shape and are matched in form of concave-convex, or the one side edge (31) of the first electrode tab (3) positioned inside in the width direction (W) and the one side edge (41) of the second electrode tab (4) positioned inside in the width direction (W) are respectively provided with a plurality of first recessing portions (R1) and a plurality of second protruding portions (P2) which form a jagged shape and are matched in form of concave-convex, or the one side edge (31) of the first electrode tab (3) positioned inside in the width direction (W) and the one side edge (41) of the second electrode tab (4) positioned inside in the width direction (W) are respectively provided with a plurality of first protruding portions (P1) and a plurality of second protruding portions (P2) which form a jagged shape and are matched in clearance fit, or the one side edge (31) of the first electrode tab (3) positioned inside in the width direction (W) and the one side edge (41) of the second electrode tab (4) positioned inside in the width direction (W) are respectively provided with a plurality of first recessing portions (R1) and a plurality of second recessing portions (R2) which form a jagged shape and are matched in clearance fit.

7. The cell according to claim 6, wherein
the first electrode tab (3) and the first protruding portion (P1) or the first recessing portion (R1) provided on the first electrode tab (3) are integrally formed;
the second electrode tab (4) and the second protruding portion (P2) or the second recessing portion (R2) provided on the second electrode tab (4) are integrally formed.

8. The cell according to claim 6, wherein a shape of the first protruding portion (P1), a shape of the first recessing portion (R1), a shape of the second protruding portion (P2), a shape of the second recessing portion (R2) each are one of a rectangle, a square, a triangle, a semicircle, a trapezoid, a polygon with more than four sides.

9. The cell according to claim 1, wherein at least one of the one side edge (31) of the first electrode tab (3) positioned inside in the width direction (W) and the one side edge (41) of the second electrode tab (4) positioned inside in the width direction (W) is flat.

10. An electrochemical device, comprising:
a cell, comprising:
a first electrode plate (1) comprising a first current collector (11) and a first active material layer (12) which is selectively provided on a surface (S11) of the first current collector (11) and contains a first active material;
a second electrode plate (2) opposite to the first electrode plate (1) in electric polarity, comprising a second current collector (21) and a second active material layer (22) which is selectively provided on a surface (S21) of the second current collector (21) and contains a second active material;
a first electrode tab (3) provided and electrically connected to the first current collector (11) of the first electrode plate (1);
a second electrode tab (4) provided and electrically connected to the second current collector (21) of the second electrode plate (2); and
a separator (5) provided between the first electrode plate (1) and the second electrode plate (2);

the surface (S11) of the first current collector (11) having a part which is not provided with the first active material layer (12) thereon and this part being defined as a first surface uncoated region (B11);

the surface (S21) of the second current collector (21) having a part which is not provided with the second active material layer (22) thereon and this part being defined as a second surface uncoated region (B21);

the first electrode tab (3) being provided on the first surface uncoated region (B11) and the second electrode tab (4) being provided on the second surface uncoated region (B21);

the first electrode tab (3) extending toward two opposite transverse edges (TE11) of the first surface uncoated region (B11) along a width direction (W) and one side edge (31) positioned outside in the width direction (W) being close to one corresponding transverse edge (TE11) of the first surface uncoated region (B11), and the first electrode tab (3) extending toward two opposite longitudinal edges (LE i1) of the first surface uncoated region (B11) along a length direction (L) and two outer side edges (32) in the length direction (L) being close to the two longitudinal edges (LE11) of the first surface uncoated region (B11), respectively; and/or the second electrode tab (4) extending toward two opposite transverse edges (TE21) of the second surface uncoated region (B21) along the width direction (W) and one side edge (41) positioned outside in the width direction (W) being close to one corresponding transverse edge (TE21) of the second surface uncoated region (B21), and the second electrode tab (4) extending toward two opposite longitudinal edges (LE21) of the second surface uncoated region (B21) along the length direction (L) and two outer side edges (42) in the length direction (L) being close to the two longitudinal edges (LE21) of the second surface uncoated region (B21), respectively;

the first electrode tab (3) and the second electrode tab (4) being spaced apart from each other in the width direction (W), and the separator (5) being presented between the first electrode tab (3) and the second electrode tab (4);

when the cell is subjected to a mechanical shock, the first electrode tab (3) and the second electrode tab (4) being deformed to puncture the separator (5) between the first electrode tab (3) and the second electrode tab (4) such that the first current collector (11) and the second current collector (21) being electrically connected.

11. The electrochemical device according to claim 10, wherein
the first electrode tab (3) is welded to the first current collector (11) of the first electrode plate (1) or is formed by cutting the first current collector (11) of the first electrode plate (1); and/or
the second electrode tab (4) is welded to the second current collector (21) of the second electrode plate (2) or is formed by cutting the second current collector (21) of the second electrode plate (2).

12. The electrochemical device according to claim 10, wherein
the first electrode tab (3) and the second electrode tab (4) each have a thickness of TT, and 5 μm≤TT≤100 μm;
the first electrode tab (3) and the second electrode tab (4) each have a length of LT, and 10 mm≤LT≤500 mm;
the first electrode tab (3) and the second electrode tab (4) each have a width of WT, and 2 mm≤WT≤250 mm.

13. The electrochemical device according to claim 10, wherein
a minimum distance between the one side edge (31) of the first electrode tab (3) positioned outside in the width direction (W) and the one corresponding transverse edge (TE11) of the first surface uncoated region (B11) is 3 mm;
a minimum distance between the each outer side edge (32) of the first electrode tab (3) in the length direction (L) and the one corresponding longitudinal edge (LE11) of the first surface uncoated region (B11) is 3 mm;
a minimum distance between the one side edge (41) of the second electrode tab (4) positioned outside in the width direction (W) and the one corresponding transverse edge (TE21) of the second surface uncoated region (B21) is 3 mm;
a minimum distance between the each outer side edge (42) of the second electrode tab (4) in the length direction (L) and the one corresponding longitudinal edge (LE21) of the second surface uncoated region (B21) is 3 mm.

14. The electrochemical device according to claim 10, wherein a distance between the one side edge (31) of the first electrode tab (3) positioned inside in the width direction (W) and the one side edge (41) of the second electrode tab (4) positioned inside in the width direction (W) is 1 mm~5 mm in the width direction (W).

15. The electrochemical device according to claim 10, wherein
the one side edge (31) of the first electrode tab (3) positioned inside in the width direction (W) and the one side edge (41) of the second electrode tab (4) positioned inside in the width direction (W) are respectively provided with a plurality of first protruding portions (P1) and a plurality of second recessing portions (R2) which form a jagged shape and are matched in form of concave-convex, or
the one side edge (31) of the first electrode tab (3) positioned inside in the width direction (W) and the one side edge (41) of the second electrode tab (4) positioned inside in the width direction (W) are respectively provided with a plurality of first recessing portions (R1) and a plurality of second protruding portions (P2) which form a jagged shape and are matched in form of concave-convex, or
the one side edge (31) of the first electrode tab (3) positioned inside in the width direction (W) and the one side edge (41) of the second electrode tab (4) positioned inside in the width direction (W) are respectively provided with a plurality of first protruding portions (P1) and a plurality of second protruding portions (P2) which form a jagged shape and are matched in clearance fit, or
the one side edge (31) of the first electrode tab (3) positioned inside in the width direction (W) and the one side edge (41) of the second electrode tab (4) positioned inside in the width direction (W) are respectively provided with a plurality of first recessing portions (R1) and a plurality of second recessing portions (R2) which form a jagged shape and are matched in clearance fit.

16. The electrochemical device according to claim 15, wherein the first electrode tab (3) and the first protruding portion (P1) or the first recessing portion (R1) provided on the first electrode tab (3) are integrally formed;

the second electrode tab (4) and the second protruding portion (P2) or the second recessing portion (R2) provided on the second electrode tab (4) are integrally formed.

17. The electrochemical device according to claim 15, wherein a shape of the protruding portion (P1), a shape of the first recessing portion (R1), a shape of the second protruding portion (P2), a shape of the second recessing portion (R2) each are one of a rectangle, a square, a triangle, a semicircle, a trapezoid, a polygon with more than four sides.

18. The electrochemical device according to claim 10, wherein at least one of the one side edge (31) of the first electrode tab (3) positioned inside in the width direction (W) and the one side edge (41) of the second electrode tab (4) positioned inside in the width direction (W) is flat.

* * * * *